(12) United States Patent
Langlinais et al.

(10) Patent No.: US 10,778,026 B2
(45) Date of Patent: Sep. 15, 2020

(54) MULTI-PHASE BUCK-BOOST CHARGER

(71) Applicant: Apple Inc., Cupertino, CA (US)

(72) Inventors: Jamie L. Langlinais, San Francisco, CA (US); Mark A. Yoshimoto, San Jose, CA (US)

(73) Assignee: Apple Inc., Cupertino, CA (US)

( * ) Notice: Subject to any disclaimer, the term of this patent is extended or adjusted under 35 U.S.C. 154(b) by 238 days.

(21) Appl. No.: 15/455,907

(22) Filed: Mar. 10, 2017

(65) Prior Publication Data

US 2018/0090945 A1    Mar. 29, 2018

Related U.S. Application Data

(60) Provisional application No. 62/398,995, filed on Sep. 23, 2016.

(51) Int. Cl.
*H02J 7/00* (2006.01)
*H02M 3/158* (2006.01)

(52) U.S. Cl.
CPC ............... *H02J 7/007* (2013.01); *H02J 7/00* (2013.01); *H02J 7/0045* (2013.01); *H02J 7/0068* (2013.01); *H02M 3/1582* (2013.01); *H02J 2207/20* (2020.01)

(58) Field of Classification Search
CPC ....... Y02E 60/12; H02J 7/0042; H02J 7/0045; H02J 7/007; H02J 7/0052; H02J 7/0068; H02J 2007/0059; H01M 10/44; H01M 10/46; H02M 3/1582; H02M 3/00;
(Continued)

(56) References Cited

U.S. PATENT DOCUMENTS 4,950,974 A    8/1990 Pagano
5,150,032 A    9/1992 Ho
(Continued)

FOREIGN PATENT DOCUMENTS

CN    101202464 A    6/2008
CN    101425749 A    6/2009
(Continued)

OTHER PUBLICATIONS

"Battery chargers in USB OTG devices", *SSZY001*, (Jun. 2010), 6 pages.
(Continued)

*Primary Examiner* — David V Henze-Gongola
*Assistant Examiner* — Mohammed J Sharief
(74) *Attorney, Agent, or Firm* — Blank Rome LLP

(57) ABSTRACT

A battery charger has at least two phases and coupled switches that are controlled using switch mode power supply (SMPS) techniques. One of the phases is part of a buck-boost circuit that includes a high side switch, which is coupled between a near end of the phase and the input, and a low side switch that is coupled between a far end of the phase and ground. The far end of the phase is also coupled to a battery, through a further high side switch. A controller signals the switches into open and closed states so that the buck-boost circuit is operated in buck mode when charging the battery at a low voltage, and in boost mode when charging the battery at a high voltage. Other embodiments are also described and claimed.

11 Claims, 14 Drawing Sheets

(58) Field of Classification Search
CPC ........ H02M 3/04; H02M 3/135; H02M 3/137; H02M 3/139; H02M 3/1584
USPC .......................................... 320/107; 307/82
See application file for complete search history.

(56) References Cited

U.S. PATENT DOCUMENTS

| | | | |
|---|---|---|---|
| 5,896,574 A * | 4/1999 | Bass, Sr. | H04B 1/38 |
| | | | 455/557 |
| 6,157,168 A | 12/2000 | Malik | |
| 6,222,347 B1 | 4/2001 | Gong | |
| 6,329,796 B1 | 12/2001 | Popescu | |
| 6,600,298 B2 | 7/2003 | McDonald | |
| 6,791,853 B2 | 9/2004 | Afzal | |
| 6,943,533 B2 | 9/2005 | Okuno | |
| 7,352,154 B2 | 4/2008 | Cook | |
| 7,489,109 B1 | 2/2009 | Qian | |
| 7,495,423 B1 * | 2/2009 | Knight | H02M 3/1588 |
| | | | 323/259 |
| 7,560,898 B1 | 7/2009 | Kranzen | |
| 7,923,858 B2 | 4/2011 | Ito | |
| 8,143,851 B2 | 3/2012 | Greening | |
| 8,368,346 B2 | 2/2013 | Batson | |
| 8,564,249 B2 | 10/2013 | Lundqvist et al. | |
| 9,203,254 B2 | 12/2015 | Balmefrezol et al. | |
| 9,209,676 B2 | 12/2015 | Geren | |
| 9,312,767 B2 | 4/2016 | Sandner et al. | |
| 9,641,079 B2 | 5/2017 | Schmalnauer | |
| 2003/0043597 A1 | 3/2003 | Betts-LaCroix | |
| 2003/0214271 A1 | 11/2003 | Bradley | |
| 2004/0070376 A1 | 4/2004 | Hoshino | |
| 2005/0151509 A1 | 7/2005 | Cook | |
| 2005/0242772 A1 | 11/2005 | Cha | |
| 2006/0006850 A1 | 1/2006 | Inoue | |
| 2006/0139819 A1 | 6/2006 | May | |
| 2007/0262651 A1 | 11/2007 | Odaohara | |
| 2008/0054855 A1 | 3/2008 | Hussain | |
| 2008/0100143 A1 | 5/2008 | Lipcsei | |
| 2008/0265839 A1 | 10/2008 | Yang | |
| 2009/0103341 A1 | 4/2009 | Lee | |
| 2009/0108677 A1 | 4/2009 | Walter | |
| 2009/0174366 A1 | 7/2009 | Ahmad | |
| 2009/0218984 A1 | 9/2009 | Parakulam | |
| 2009/0261796 A1 | 10/2009 | Ito | |
| 2009/0325056 A1 | 12/2009 | Greening | |
| 2010/0164446 A1 | 7/2010 | Matsuo | |
| 2011/0025124 A1 | 2/2011 | Brabec | |
| 2011/0121653 A1 | 5/2011 | Hartular | |
| 2011/0234151 A1 | 9/2011 | Uan-Zo-Li | |
| 2011/0273132 A1 | 11/2011 | Khaitan | |
| 2011/0298426 A1 * | 12/2011 | Hussain | H02J 7/0069 |
| | | | 320/128 |
| 2012/0001610 A1 | 1/2012 | Klein | |
| 2012/0074916 A1 * | 3/2012 | Trochut | H02M 3/1582 |
| | | | 323/271 |
| 2012/0080945 A1 | 4/2012 | Vasadi | |
| 2012/0293021 A1 | 11/2012 | Teggatz | |
| 2013/0093381 A1 | 4/2013 | McGinley | |
| 2013/0093514 A1 | 4/2013 | Xu | |
| 2013/0127548 A1 | 5/2013 | Popplewell | |
| 2013/0141070 A1 | 6/2013 | Goessling | |
| 2013/0154550 A1 | 6/2013 | Balmefrezol | |
| 2013/0285610 A1 | 10/2013 | Katou | |
| 2014/0184140 A1 * | 7/2014 | Lee | H02J 7/022 |
| | | | 320/103 |
| 2014/0203761 A1 | 7/2014 | Paparrizos | |
| 2014/0266011 A1 * | 9/2014 | Mehta | H02J 7/0042 |
| | | | 320/107 |
| 2014/0354251 A1 | 12/2014 | Williams | |
| 2015/0069957 A1 * | 3/2015 | Chang | H02J 7/0052 |
| | | | 320/107 |
| 2015/0097546 A1 | 4/2015 | Pan | |
| 2015/0162828 A1 * | 6/2015 | Sandner | H02M 3/158 |
| | | | 323/271 |
| 2015/0214770 A1 | 7/2015 | Chen | |
| 2015/0372526 A1 | 12/2015 | Greening et al. | |
| 2016/0056663 A1 * | 2/2016 | Deng | H02J 7/022 |
| | | | 320/108 |
| 2016/0064986 A1 * | 3/2016 | Langlinais | H02J 7/0078 |
| | | | 320/134 |
| 2016/0087462 A1 * | 3/2016 | Kudo | H02J 7/0068 |
| | | | 320/162 |
| 2016/0099593 A1 | 4/2016 | Lim | |
| 2016/0197552 A1 | 7/2016 | Giuliano | |
| 2016/0233766 A1 | 8/2016 | Todorov | |
| 2016/0380455 A1 * | 12/2016 | Greening | H02J 7/0044 |
| | | | 320/114 |
| 2017/0077816 A1 * | 3/2017 | Satterfield | H02M 3/158 |
| 2017/0133842 A1 | 5/2017 | Freeman | |
| 2017/0248996 A1 * | 8/2017 | Zhang | G06F 1/26 |
| 2017/0279359 A1 | 9/2017 | Goncalves | |
| 2018/0115236 A1 * | 4/2018 | Wibowo | H02M 1/15 |

FOREIGN PATENT DOCUMENTS

| | | |
|---|---|---|
| CN | 103560550 A | 2/2014 |
| CN | 103825329 A | 5/2014 |
| CN | 106114265 | 11/2016 |
| EP | 1919058 A2 | 5/2008 |
| JP | H05049179 A | 2/1993 |
| JP | H11196541 A | 7/1999 |
| JP | 2000029544 A | 1/2000 |
| JP | 2000293241 A | 10/2000 |
| JP | 2001069682 A | 3/2001 |
| JP | 2002044941 A | 2/2002 |
| JP | 2003009515 A | 1/2003 |
| JP | 2004328996 A | 11/2004 |
| JP | 2005509391 A | 4/2005 |
| JP | 2007221981 A | 8/2007 |
| JP | 2008118847 A | 5/2008 |
| JP | 2009136097 A | 6/2009 |
| JP | 2014045593 A | 3/2014 |
| KR | 1020050104431 A | 11/2005 |
| KR | 1020060098636 A | 9/2006 |
| KR | 1020130036691 A | 4/2013 |

OTHER PUBLICATIONS

Huang, Wenkang, et al., "A Scalable Multiphase Buck Converter with Average Current Share Bus", *International Rectifier*, (2003), 7 pages.

Lee, Eric, "Precision Output Current Limiting Using Average Current Monitor Feature", *Power Designer—Expert tips, tricks, and techniques for powerful designs*, No. 131; Retrieved from the Internet: <http://national.com/powerdesigner>, (2011), 7 pages.

Rincon-Mora, Gabriel A., "Accurate and Lossless Current-Sensing Techniques for Power Applications—A Practical Myth?", *Design Lines Power Management*, Retrieved from the Internet: <http://www.eetimes.com/document.asp?doc_id=1273006, (Mar. 16, 2005), 5 pages.

Kwon, Dongwon et al, "Single-Inductor-Multiple-Output Switching DC-DC Converters", IEEE Transactions on Circuits and Systems II: Express Briefs, IEEE, US, vol. 56, No. 8, Aug. 1, 2009, pp. 614-618, ISSN: 1549-7747.

Ming-Hsin Huang, et al., "Single-Inductor Multi-Output (SIMO) DC-DC Converters With High Light-Load Efficiency and Minimized Cross-Regulation for Portable Devices", IEEE Journal of Solid-State Circuits, vol. 44, No. 4, Apr. 1, 2009 (Apr. 1, 2009), pp. 1099-1111, XP055154034, ISSN: 0018-9200, DOI: 10.1109/JSSC. 2009.2014726.

Ozawa, H. et al., "Power Management Technology", Fujitsu-Scientific and Technical Journal, Fujitsu Ltd, JP, vol. 34, No. 1, Sep. 1, 1998 (Sep. 1, 1998), pp. 68-77, XP000859887, ISSN: 0016-2523, Retrieved from the Internet: URL: www.fujitsu.com/downloads/MAG/vol34-1/paper09.pdf.

* cited by examiner

MULTI-PHASE BUCK-BOOST CHARGER

This application claims the benefit of the earlier filing date of U.S. Provisional Patent Application No. 62/398,995, filed Sep. 23, 2016.

FIELD

An embodiment of the invention relates to battery charging circuits for use in portable (mobile) devices such as smartphones to charge the battery of the device. Other embodiments are also described.

BACKGROUND

The evolution of battery charging for mobile applications has been pushing a greater number of features and requirements into battery chargers that are inside a portable (mobile) device, such as a smartphone. Next generation batteries offer greater capacities and extended voltage operating ranges. As Li-Ion battery chemistries improve and the maximum battery voltage rises and approaches 5V, this may mandate chargers which are capable of boosting the input voltage, e.g., 5V, at a Universal Serial Bus (USB) connector (which voltage is provided by an external AC-DC power adapter, for example) in order to fully charge such a battery. Additionally, in the presence of high input path or cable resistances, even traditional Li-Ion batteries can have their charge times dramatically increased if only 5V are available for charging.

Also, as the minimum battery voltage falls below the minimum usable voltage required by system components within the portable device, additional voltage boost circuitry will be needed to power these loads from the battery, and prevent brown outs when the battery is at low states of charge.

Portable devices may also need to have a popular feature referred to as USB On the Go (OTG) support, which enables the portable device to act as a host when an accessory device is attached to its USB connector, including for purposes of providing power to the attached accessory device. This mandates yet a third boost circuit inside the portable device, in order to provide a steady 5V DC to an attached, USB-compatible accessory. In the case of a USB-C specification connector, the boost circuit in the portable device needs to provide a regulated 5V for compatibility.

Furthermore, larger battery capacities require greater charging currents in order to keep portable device charge times sufficiently short (and therefore acceptable). This makes the charger circuitry more sensitive to input resistance (charging cable voltage drops) and available input power.

In parallel to all of these system demands it is desirable to minimize the size of the battery charger circuitry in order to offer the smallest and lightest possible portable device.

SUMMARY

In accordance with an embodiment of the invention, a switching battery charger circuit (charger) is described in this disclosure that may be able to accomplish several if not all of the system demands stated above in the Background section. The charger has at least two individual phases and several switches that are coupled to the phases. Each phase has inductance that serves to transfer energy from an input to a battery for charging the battery, when the solid state switches are being controlled using switch mode power supply (SMPS) techniques. At least one of the phases (a first phase) is part of a buck-boost circuit that includes a high side switch, which is coupled between a near end of the phase and the input, and a low side switch that is coupled between a far end of the phase and ground. The far end of the phase is also coupled to the battery, through a further high side switch. Based on its knowledge of the voltage at the input, a controller can signal the switches into open and closed states so that the buck-boost circuit is operated in buck mode when charging the battery at a low voltage, and in boost mode when charging the battery at a high voltage (that is higher than the low voltage.)

The above described charger may be enhanced to also provide a system boost (a power supply voltage that is higher than the battery voltage), through the addition of a second output and a further switch that couples the first phase to the second output. The controller configures certain switches of the charger so that they, together with the first phase, become a boost converter that boosts the battery voltage (at the input of the boost converter) at the second output, through the first phase.

The charger may also be operated to provide power from the battery to the input of the charger, e.g., as a reverse boost that supplies power to the input at a voltage higher than the battery voltage.

In another embodiment, the phases of the multi-phase charger are asymmetric or have different inductances, e.g., two phases whose inductors differ by 25% or more relative to each other. This allows the inductors sizes to be reduced while still allowing acceptable charger efficiencies. The area savings of the multi-phase asymmetric charger is especially useful for portable devices where height and size are important design constraints. For greater battery charging currents, the circuit may have more than two phases/inductors.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

FIG. 14 is a block diagram of an example portable electronic device.

DETAILED DESCRIPTION

Several embodiments of the invention with reference to the appended drawings are now explained. Whenever the shapes, relative positions and other aspects of the parts described in the embodiments are not explicitly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Multi-Phase Charging

Figure 1:
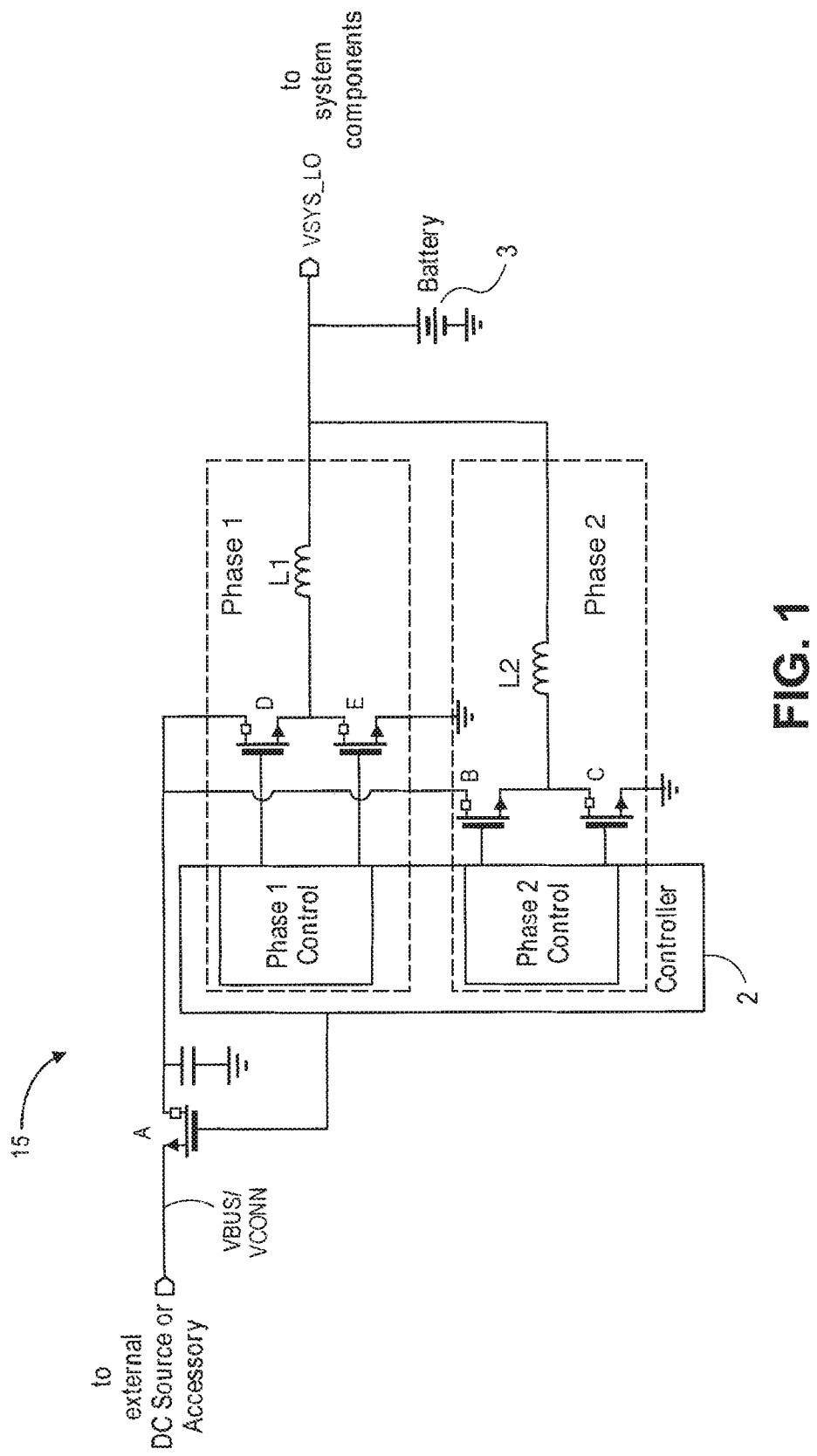
FIG. 1 is a schematic of a multi-phase switching battery charger circuit for a portable device.

FIG. 1 is a combined circuit schematic and block diagram of a multi-phase, switching charger 15. In one embodiment, as seen in FIG. 14, the charger 15 may be contained inside the housing of a portable electronic device 10 for charging a battery 3 of the portable device 10. The portable device may be, for example, a smartphone, that has the following system components: a display subsystem 11 (e.g., a touchscreen subsystem); a processor subsystem 13 (e.g., a system on a chip); and a memory subsystem 14 (e.g., flash memory storage. An externally exposed, multi-pin connector (also referred to here as an external connector 17), such as a USB compliant connector, of which only a VBUS (or VCONN) pin is shown in FIG. 1 serves to route input current/power to the charger 15 through the VBUS pin. An external DC power source such as an AC power adapter (not shown) may be plugged or attached to the connector 17. The input power may then flow through a series pass solid state switch A. The switch A is also controlled to open and thereby turn off input power to the charger when desired by a charging controller 2. When disconnected from the external DC power source, the connector 17 may be used by the portable device 10 to provide power to an accessory such as a plugged-in headset (not shown).

The charging controller 2 may be a programmed processor or microcontroller that conducts oversight of the various charging scenarios and power delivery modes of which the charger 15 is capable. It can open and close all of the solid state switches A-J as needed (by signaling on the control electrodes of the switches, e.g., by producing gate driver signals for the gate electrodes of the illustrated field effect transistors, FETs, that may implement the switches A-J, as shown in the examples here.) The controller can do so in order to configure the charger for a particular charging or power delivery scenario. This oversight may be informed by for example the controller 2 i) sensing a state of the charge of the battery 3 (via the voltage and charging current of the battery 3), ii) sensing the voltage and current of other loads (e.g., higher voltage system components such as the display subsystem 11, that need a supply voltage, VSYS_HI, which can be greater than what the battery 3 can sometimes provide when it is in a low state of charge), iii) its knowledge of the input power that may or may not be available at the VBUS pin, and iv) its knowledge of whether an external DC power source (input power delivery is available) or an accessory (output power delivery is needed) is attached to the VBUS pin. The controller 2 may also have knowledge of various SMPS control schemes for achieving power conversion by suitably operating a particular arrangement of switches and phases of the charger 15, and also knowledge of various battery charging profiles and techniques for determining battery voltage set points, for charging for example a Li ion battery of the portable device.

In the example two-phase topology shown in FIG. 1, the controller 2 includes phase 1 control circuitry and phase 2 control circuitry, for controlling the switching (opening and closing) of high side solid state switches B, D which are coupled to the near ends of phases 2, 1, respectively, and low side solid state switches C, E which are also coupled to the near ends of the phases 2, 1, respectively. Both phases may be operated independently to transfer power from the input VBUS to a first output of the charger 15 at a VSYS_LO node (to which system components, such as the memory subsystem 14, and the battery 3 are coupled.) In one embodiment (as shown in all of the figures here), the far end of the phase 2 is "directly coupled" to the first output node VSYS_LO, e.g., without any intervening three-terminal devices (active devices) such as transistors. Control of the switching of the phases may be in accordance with any conventional, buck converter (step down) SMPS control algorithm, so as to for example maintain a feedback voltage derived from the first output of the charger, VSYS_LO, within a target range, resulting in the charging of the battery. Note that the concepts described here are not limited to a two-phase charger circuit; additional phases can be added by being coupled to the first output (VSYS_LO node) in parallel, to increase the power output of the charger 15.

In one embodiment, the charger has two phases 1, 2, which are asymmetric—their respective inductors have different inductance, e.g., differing by at least 25%. In this example, the circuit has only two phases 1, 2 as shown, where reducing the inductance of one phase relative to the other helps reduce the overall size of the multi-phase charger. As an example, consider a 28 W charger, providing 7 A DC to a battery that is at 3.8V (nominal.) Referencing currently available inductors that are designed for 3.5 A DC, replacing the 1 uH inductor of phase 1 with a 0.47 uH inductor reduces the size of the two inductors/phases to 3.2 mm×2.5 mm×1.0 mm+2.5×2.0×1.0 mm for a total of 13.0 mm^2, as compared to a total of 16.0 mm^2 when using a 1 uH inductor for each phase. This however has an unfortunate tradeoff in charger efficiency, as the reduced inductance in phase 1 results in larger ripple currents, or higher operating frequencies, or both. However, inductor core losses and device switching losses tend to primarily affect efficiencies at lower charge currents and lower input currents. These losses may be mitigated, by adopting an asymmetric design. This can allow the controller 2 to configure the charger 15 to operate with a single phase (phase 2, greater inductance) when the charge currents or system loads on VSYS_LO are light, while allowing the other phase (phase 1, lower inductance) to operate at higher charge currents or higher system currents, where DC resistance (DCR) losses tend to dominate. Further, since the coil of an inductor that has lower inductance often allows for lower DCR, this approach can actually translate into a total efficiency gain at high charge currents.

In the case of asymmetric phases, some form of current sharing or current balancing algorithm (e.g., based on per-phase current sensing) may be provided in the controller 2, to keep the DC currents in the two phases similar. Conversely, having a phase that has lower inductance can allow for higher charge currents for the same footprint, by allowing greater currents in the lower inductance phase. This may be achieved using asymmetric or proportional current balancing circuitry (not shown) that is coupled between the two phases.

Note also that one or more phases with their associated high side and low side switches, similar to phase 2 and its switches B, C, may be added to the circuit shown in FIG. 1, essentially in parallel with the arrangement for phase 2, where the switches of these additional phases may be operated together with those of phase 2 as a single multi-phase topology, so as to increase the charging power.

Reverse Boosting

For USB-C compliance or USB OTG support, of an accessory that is attached to the VBUS pin of the external connector 17, a voltage boost circuit is needed to produce a voltage on VBUS that is higher than the battery voltage, VBAT. This is also referred to here as reverse boosting of the battery voltage. This voltage boost can be implemented using the charger circuit in FIG. 1 by configuring the controller 2 to use either phase 1 or phase 2 by itself in accordance with any suitable SMPS voltage boost converter algorithm, without the need for additional components or solid state power switches. This will allow the system in FIG. 1 to supply for example regulated 5V power back to VBUS from a low battery voltage, e.g., 3.8V, without an additional phase/inductor. In the two-phase version shown, this can be accomplished using either phase 1 or phase 2 by itself. As an example, pulsing the low side switch C in accordance with any suitable, voltage boost converter (step up) SMPS control scheme, while continuously keeping the high side switch B closed and also keeping high and low side switches D, E of phase 1 open, will provide the boosted voltage through phase 2, at VBUS, while phase 1 remains idle (its inductor is not conducting switched current).

Buck-Boost Charging

Figure 2:
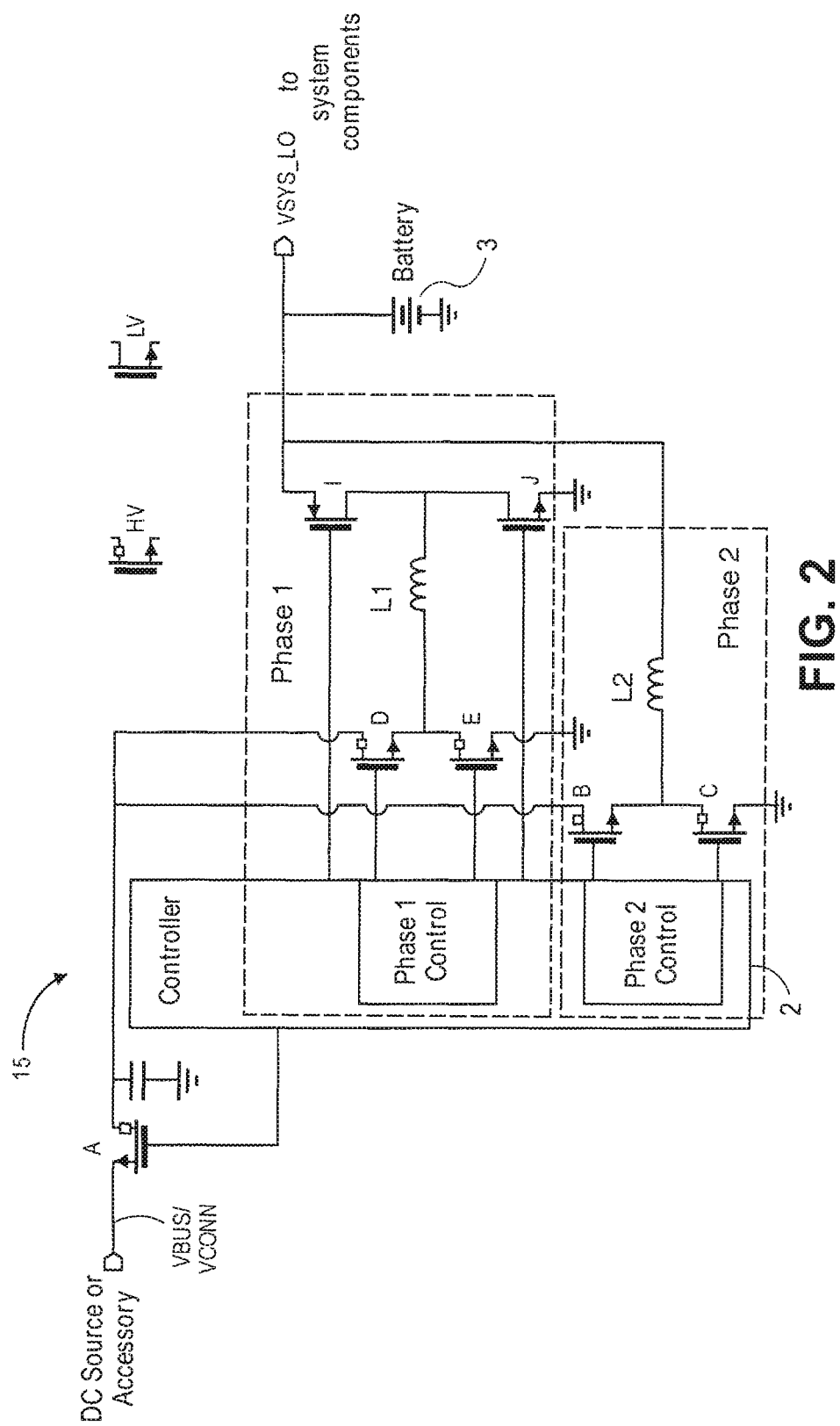
FIG. 2 is a schematic of a multi-phase switching battery charger circuit having a buck-boost charging circuit in accordance with an embodiment of the invention.

The charger 15 may also need to charge "higher" battery voltages, namely battery voltages that are either greater than the input level (at VBUS), or are lower than but too close to the input level (not low enough, or insufficiently low.) The input level on VBUS may be for example produced by an external DC source, such an AC-DC power adapter, which has been "plugged into" or otherwise attached to the portable device 10. A voltage boosting circuit is needed, that can produce a voltage at the first output, VSYS_LO, that is higher than the input level on VBUS. Having a "boosting charger" here can also reduce charge times, especially in the presence of high input path resistance, e.g., external cable voltage drops at VBUS. As the usable charge current generally decreases as a battery approaches full charge, it may be sufficient to implement the boosting here on a single phase of the multi-phase charger 15. To achieve this, FIG. 2 shows an embodiment of the charger 15 that can be configured into a four-switch, buck-boost circuit around a single phase, here phase 1. The buck-boost circuit includes the addition of high side switch I and low side switch J, to what is otherwise similar to the circuit of FIG. 1. The switches I, J have a shared node that is coupled to one end of phase 1, and opposing nodes that are coupled to VSYS_LO and ground as shown, while switches D, E remain coupled (as in FIG. 1) to another end of the phase 1 inductor. The control nodes of the switches I, J are driven by additional outputs of the controller 2. The four switches I, J, D, E are controlled by the controller 2 in accordance with any suitable boost mode or boost converter control scheme, to provide the needed voltage boost at VSYS_LO (relative to the input level at VBUS). The four switches I, J, D, E of the buck-boost circuit may alternatively be operated in buck mode or as a buck converter, to provide a stepped down voltage at VSYS_LO (relative to the input level at VBUS), when charging the battery 3 that is in a low voltage state. Note that phase 2 may remain idle in this case, while phase 1 is being used during either buck mode or boost mode to charge the battery; this may be achieved by the controller 2, which signals the switches B, C to stay open continuously.

Now, there may be instances where the battery voltage is "much" lower than the largest expected input voltage on VBUS (e.g., 20V at VBUS and 4.2V at VSYS_LO.) To accommodate such situations, lower voltage (LV) switching transistors (here, field effect transistors, FETs) can be utilized for implementing the solid state switches I, J, as shown in FIG. 2. In the particular case of asymmetric phases (where phase 1 has smaller inductance than phase 2, as shown in the example here), the switches I, J may be coupled to a low inductance phase (here, phase 1), to enable more efficient, single phase charging through that phase, when a low power external DC source (e.g., a low power AC-DC adapter) is attached to the VBUS pin. Alternatively, the switches I, J can be coupled to a high inductance phase (where phase 1 in that case has larger inductance than that phase 2) which would allow more efficient charging of the battery at high battery voltages by using the higher phase inductance to obtain the needed voltage boost.

Note also that one or more phases with their associated high side and low side switches, similar to phase 1 and its coupled switches D, E, I, J, may be added to the circuit shown in FIG. 2, essentially in parallel with the buck-boost arrangement of phase 1, where the switches of such additional phases may be operated together with those of phase 1 as a single, multi-phase topology, through additional phase control circuitry in the controller 2, so as to increase the charging power during either boost mode or buck mode.

System Boost

Figure 3:
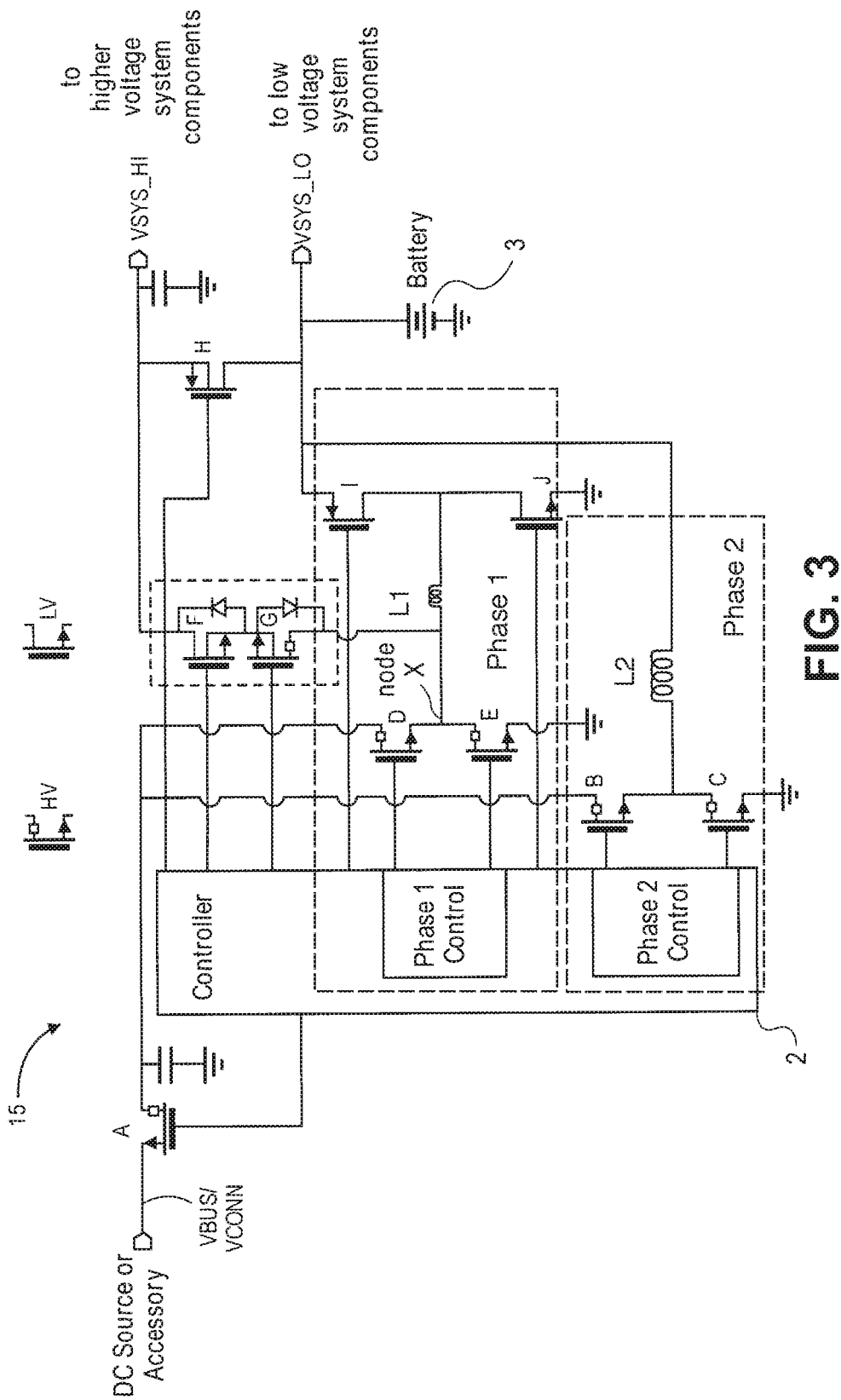
FIG. 3 is a schematic of a multi-phase switching battery charger circuit having the buck-boost charging circuit and system boost capability.

Turning now to FIG. 3, an embodiment of the charger 15 is shown that also has a system boost converter to supply system components of the portable device with a boosted voltage at a second output, VSYS_HI. The input of the system boost converter is taken from the VSYS_LO node to which the battery 3 is coupled; the system boost may be activated only if the battery voltage is too low to supply power to those system components (on the VSYS_HI node) directly. Referring to FIG. 3, at least one additional solid-state switch FG is needed for this purpose, coupling node X (or the near end of phase 1) to the second output and noting that the circuit in FIG. 3 is otherwise the same as in FIG. 2 except for the addition of the switch FG and a bypass switch H (described below.) However, since a switching node X (indicated in FIG. 3) may now be switched from a "high" voltage, e.g., 20V at VBUS, to ground, 0V, the switch FG should be implemented as a pair of FETs F, G coupled in series but pointing in opposite directions (as shown). This is to prevent forward biasing of the body diode if a single FET were used to implement switch FG. One of these FETs F, G, here the FET F, could be a lower voltage (LV) device while the other, here FET G, could be a higher voltage (HV) device, as indicated in the figure, provided that this is permissible in view of the required VSYS_HI voltage. To operate the system boost in this case, FETs F, G may be pulsed together (ON together, and OFF together) in relation to pulsing the low side switch E, in accordance with any suitable, voltage boost-type (step up) SMPS control algorithm, while keeping switch I closed and the rest of the switches open. This will provide voltage boost from the battery 3 to the second output VSYS_HI through phase 1, while phase 2 is kept idle.

The circuit schematic shown in FIG. 3 also has another difference relative to the circuit of FIG. 2, and that is the addition of a separate, bypass switch H that is directly coupling the VSYS_HI and VSYS_LO nodes. The bypass switch H may be viewed as an active diode circuit that conducts when for example there is a transient that causes the first output VSYS_LO to go higher than the second output VSYS_HI. This allows the system boost to effectively become de-activated when the switch H is closed (active diode is conducting), because VSYS_HI is then essentially shorted to VSYL_LO through switch H. This state may also be forced, by the controller 2: for example, the controller 2 may signal the bypass switch H to close, when it senses that the battery voltage is sufficiently high as to directly supply the higher voltage system components (or system loads) on the VSYS_HI node, or when it responds to a transient that causes the second output VSYS_HI to go lower than VSYS_LO.

Since the system boost (using the circuit of FIG. 3) may only be needed (to supply power to the system components on the second output) at low battery voltages, and the buck-boost charging of FIG. 2 may only be needed at high battery voltages, these two circuits can utilize the same inductor/phase, here, phase 1, without conflict. Also, implementing the reverse boost (see FIG. 1) on the other phase, here, phase 2, allows the system boost to operate simultaneously with the reverse boost, where the latter is needed when a supported accessory is attached to the portable device 10 (at the VBUS pin of the external connector) and is requesting power from the portable device.

The system boost can utilize either a low or a high inductance phase, depending on system requirements. Using a low inductance phase can support high loads (via higher inductor saturation currents for the same physical inductor size) at the cost of poorer efficiency. Conversely, using a high inductance phase may improve efficiency of the system boost, and it may also allow higher current to be provided during reverse boost (to a connected accessory or USB OTG support) for a given footprint.

Use Case Examples

The following sections and FIGS. 4-13 are used to illustrate operation of the charger 15 of FIG. 3 under various use cases or configurations, including different battery voltages, VBAT. The schematic in each of those figures is essentially a copy of the schematic of FIG. 3, except enhanced with marks to indicate power flow and the states of the various solid state switches. Note that an "X" placed over a switch symbol indicates the switch is continuously open (or the corresponding FET is turned OFF), during that use case. Three battery voltage ranges may be defined for this illustration:

1. Battery High: VBAT>VBAT_HI; in this range the battery voltage is greater than an upper threshold, VBAT_HI, and hence is sufficient to supply the high system voltage, VSYS_HI, directly, but could be approaching the VBUS input voltage and therefore the operation of a charger buck-boost may be needed in order to charge the battery 3.

2. Battery Mid: VBAT_LO<VBAT<VBAT_HI; in this range, where the battery voltage is greater than a lower threshold VBAT_LO but less than the upper threshold VBAT_HI, the battery does not require the buck-boost to charge, and is also sufficient to supply the high system voltage (VSYS_HI) directly.

3. Battery Low: VBAT<VBAT_LO; in this range, where the battery voltage is less than the lower threshold VBAT_LO, the battery does not require the buck-boost to charge, but can no longer directly supply the high system voltage, hence operation of the system boost is required to supply VSYS_HI.

Example 1—Unplugged in Battery High or Battery Mid

Figure 4:
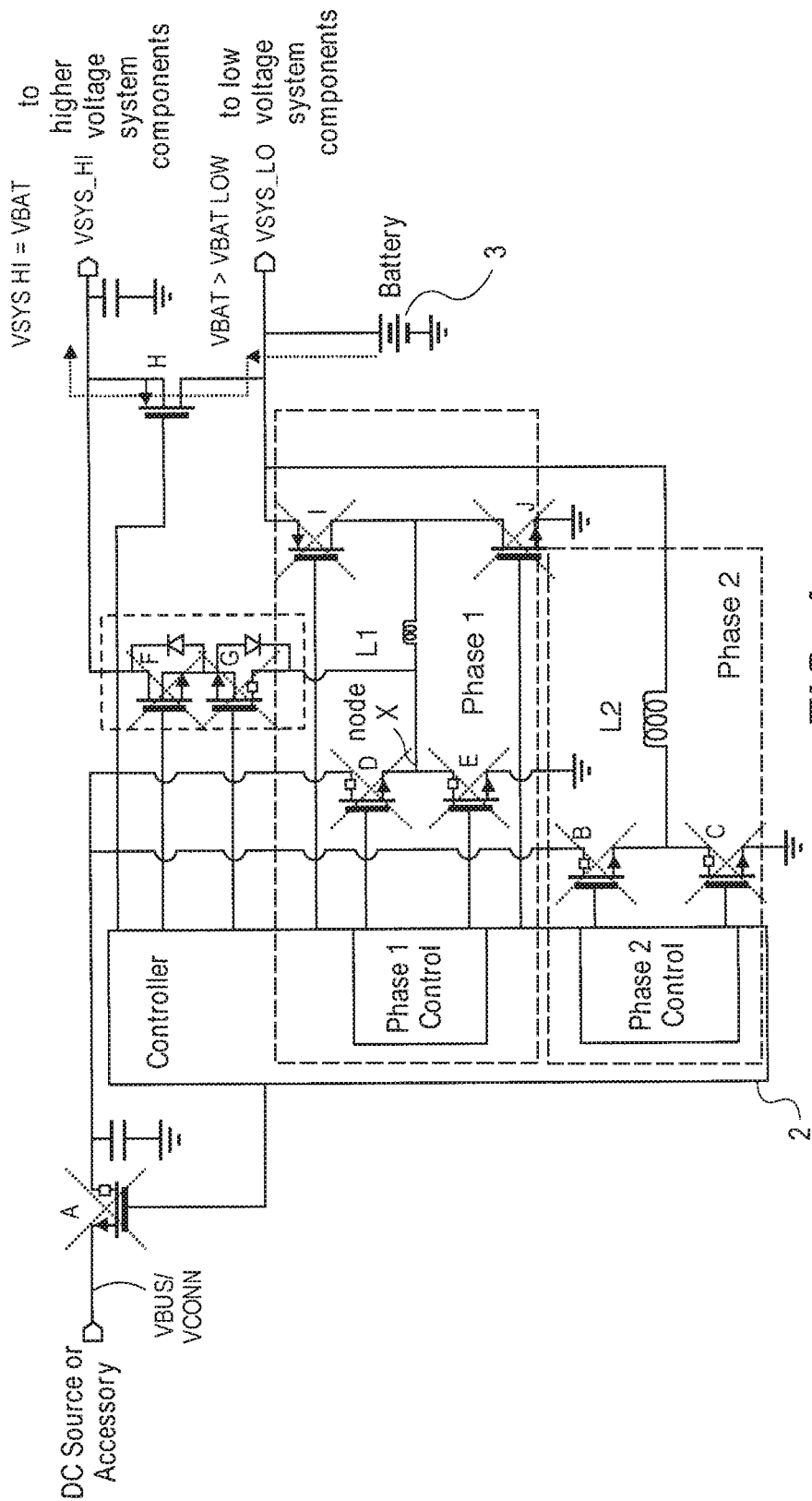
FIGS. 4-13 show various use cases of the battery charger circuit of FIG. 3.

Referring now to FIG. 4, in this scenario there is no external DC source or accessory attached to VBUS, and the battery voltage is above a lower threshold so that battery 3 is capable of directly supplying VSYS_HI, e.g., without any voltage boost needed. Here it is sufficient to close the bypass switch H so that power can be supplied directly to the higher voltage system components by the battery 3 alone, through the bypass switch H (as shown by the dotted line power path), while opening all other switches A-G, I, J (as shown by the "X" symbol on each of those switches) and so both phases of the charger are idle.

Example 2—Unplugged in Battery Low

Figure 5:
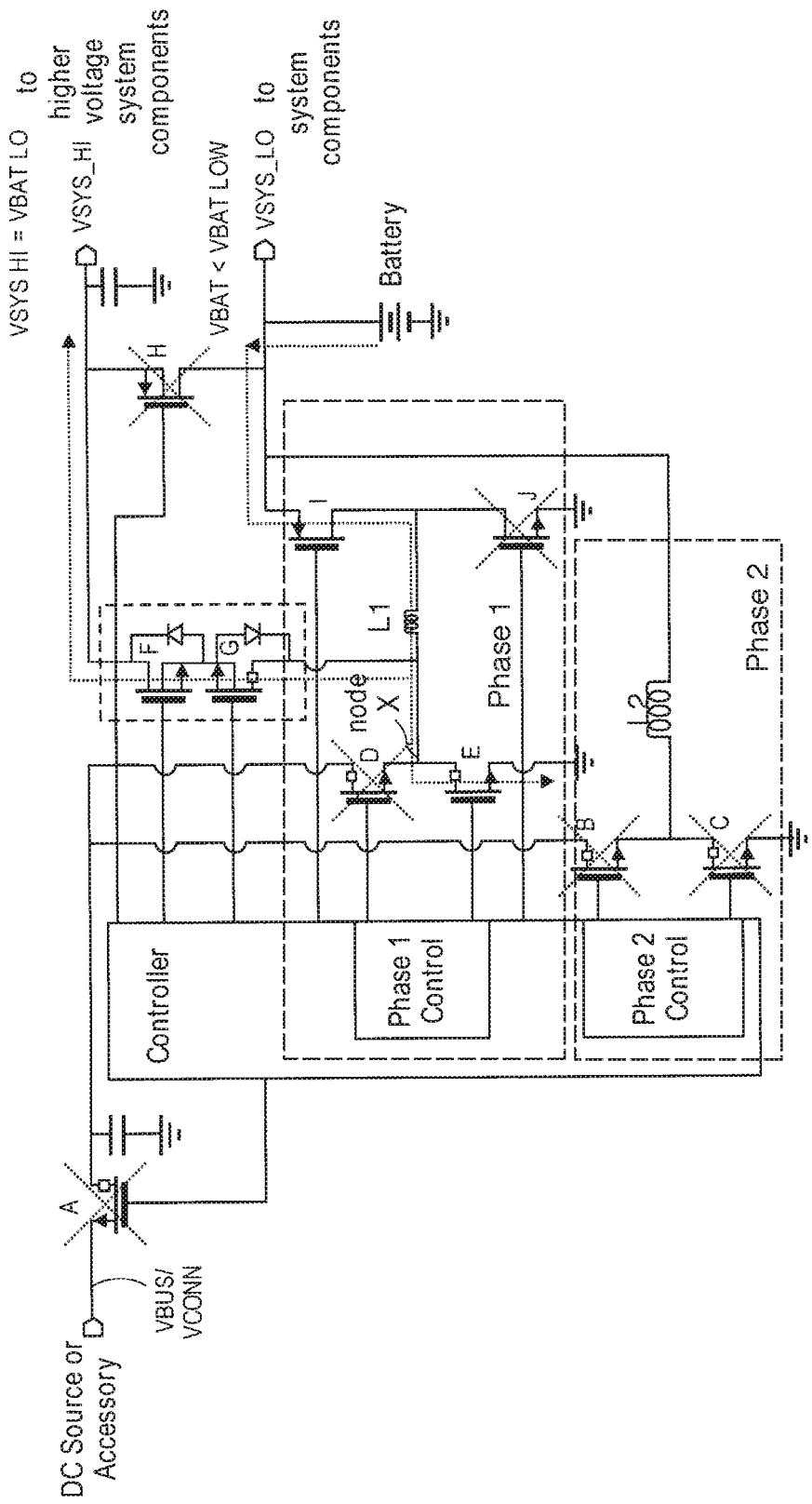

In this scenario, illustrated in FIG. 5, there is no DC source or accessory attached to VBUS, and the battery voltage is less than the lower threshold so that the battery 3 can no longer directly supply the VSYS_HI components (or loads.) Accordingly, the controller 2 now activates system boost through phase 1 only, as illustrated by the dotted line for the power path from the battery 3, through phase 1, through switch E and switch FG, to VSYS_HI, (while phase 2 stays idle). This maintains (e.g., regulates) VSYS_HI at, for example, VBAT_LO. This may be done by continuously signaling the switches D, B, C to remain open and the switches FG, I to remain closed, while pulsing the switch E according to any suitable, voltage boost type (step up) SMPS controller algorithm, so that VSYS_HI=VBAT_LO, while VBAT<VBAT_LO.

Example 3—Accessory Attached in Battery High or Battery Mid

Figure 6:
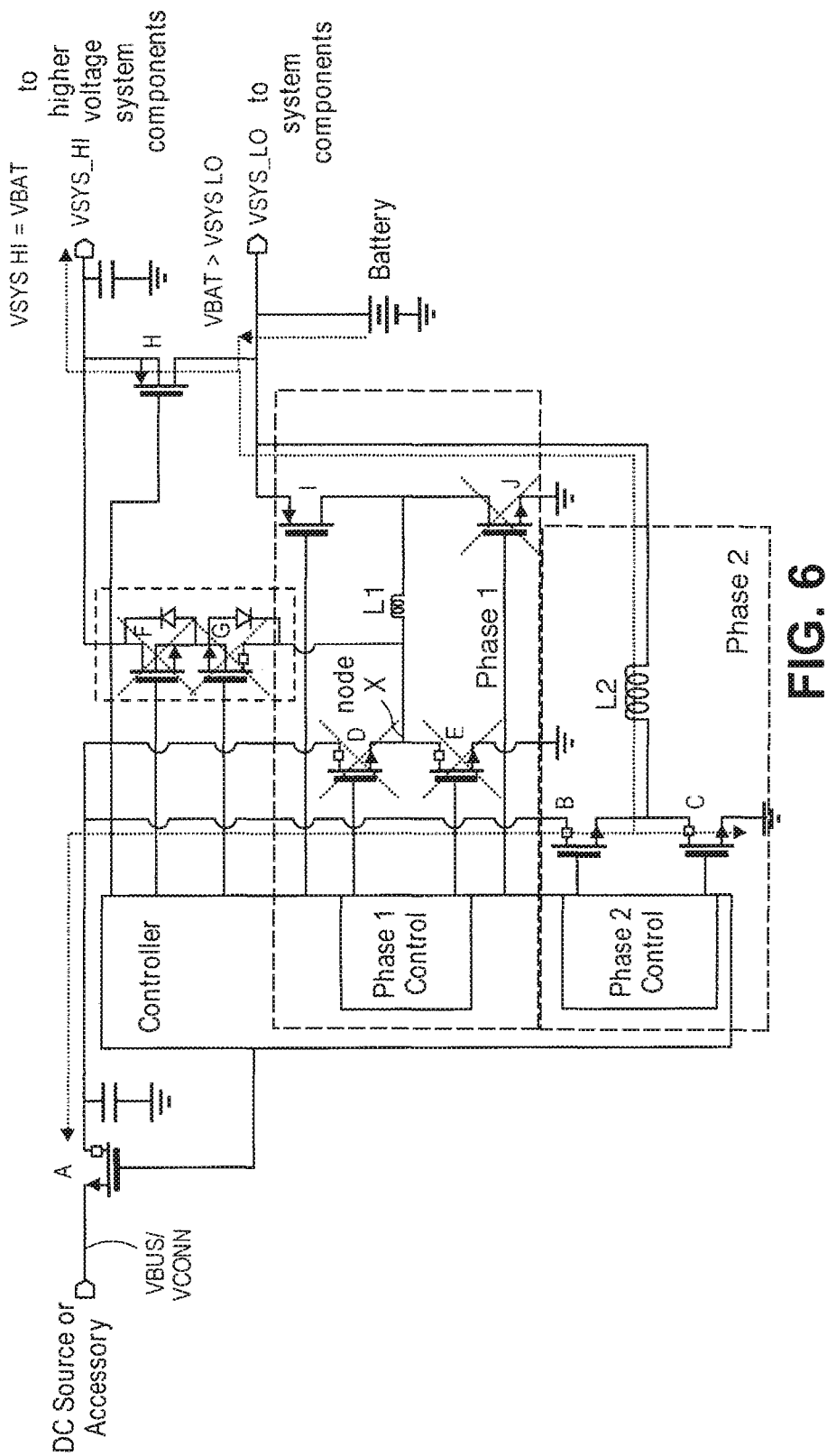

In this scenario—see FIG. 6—a USB OTG accessory (not shown) may be attached at VBUS, and is requesting 5V power, while the battery 3 is capable of directly supplying VSYS_HI (but it may be at less than 5V.) Here, the reverse boost is operating (as indicated by the dotted power path line drawn from the battery 3 through phase 2 and then through switch B and switch C, and then the switch A) by keeping switches A, B continuously closed while pulsing switch C according to any suitable, voltage boost type (step up) SMPS controller algorithm. Also, the bypass switch H can be kept closed as shown, so the battery 3 can also directly supply VSYS_HI. Note that switch I may be kept open or closed during the reverse boost, since switches D, E are continuously kept open (thereby disabling phase 1).

Example 4—Accessory Attached in Battery Low

Figure 7:
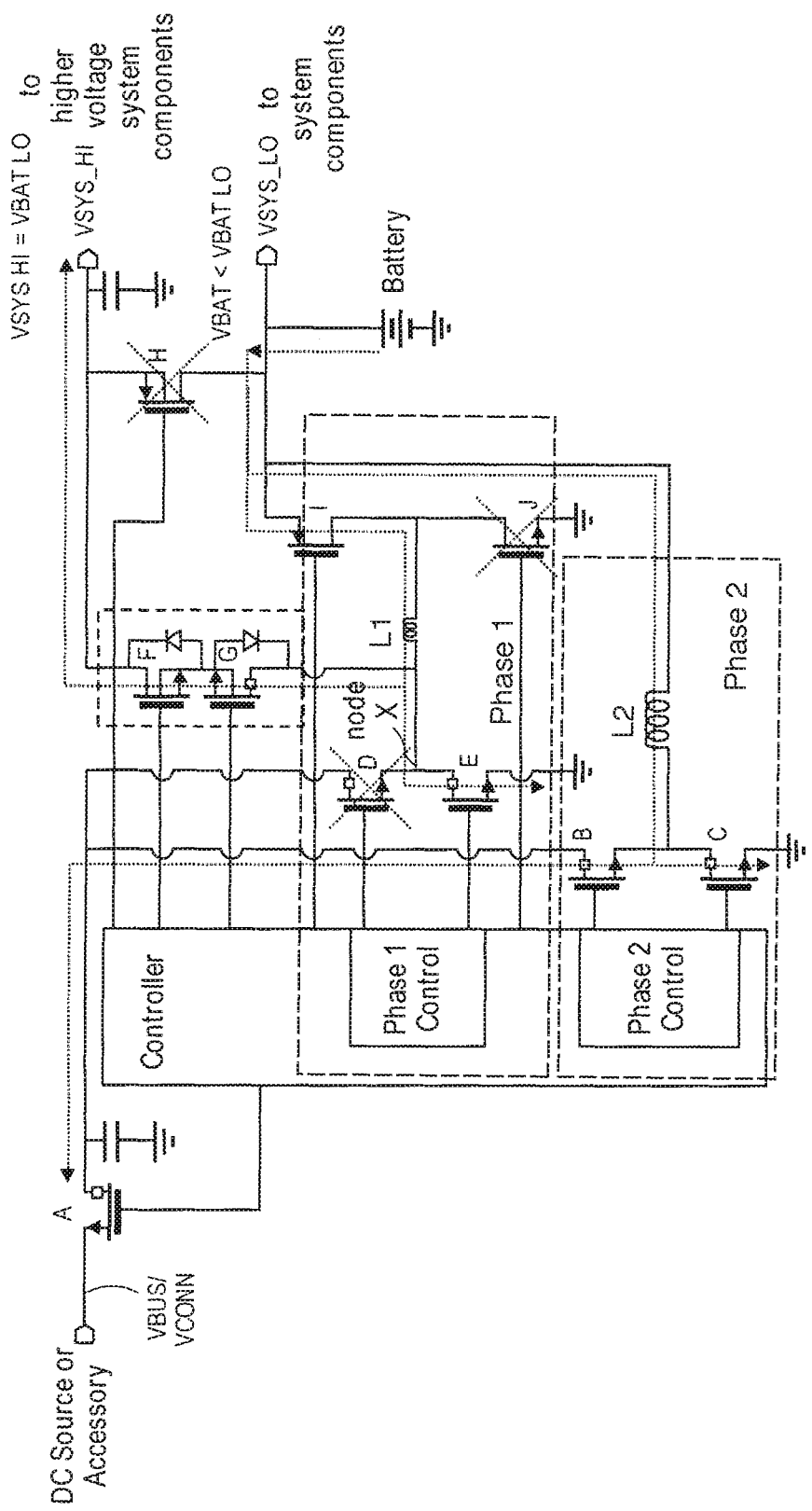

In this scenario, seen in FIG. 7, a USB OTG accessory (not shown) may be attached to VBUS, and is requesting 5V power. Switch A is therefore closed. Since the battery 3 is not capable of directly supplying VSYS_HI (because its voltage is less than the lower threshold), switch H is opened. Also, both the reverse boost and system boost are activated here "in parallel" from the battery 3 and operate simultaneously: the system boost is through phase 1, by keeping switches FG, I continuously closed and switches D, J continuously open, while pulsing switch E according to any suitable, voltage boost type or step up SMPS controller algorithm; and the reverse boost is through phase 2, by maintaining switch B continuously closed while pulsing switch C according to any suitable, voltage boost type or step up SMPS controller algorithm.

Example 5—Low Input Voltage Charging in Battery High

Figure 8:
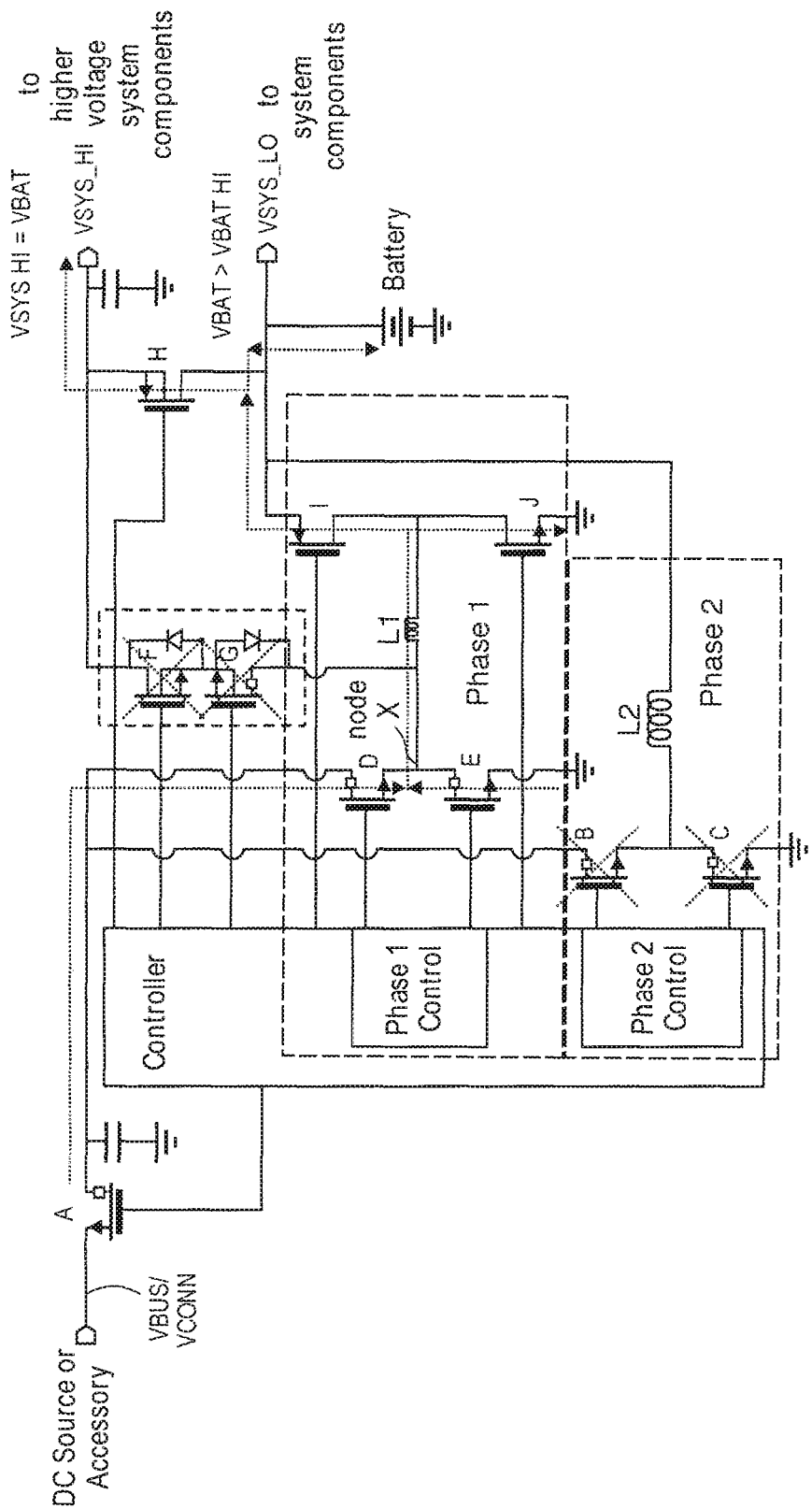

In this scenario, reflected in FIG. 8, an external DC power source (not shown) may be attached to VBUS, and switch A is therefore closed by the controller 2. The battery 3 is in a high voltage state, so that VSYS_HI can be supplied "directly" from the battery—no boost converter needed and switch H is therefore closed. Here, the VBUS voltage is insufficient to charge the battery 3, therefore requiring buck-boost charging to be activated, here through phase 1 only, as follows: switches B, C, FG are kept open continuously (so that phase 2 remains idle), while switches D, E, I, J are pulsed according to any suitable buck-boost type or step-up SMPS controller algorithm.

Example 6—Charging in Battery Mid

Figure 9A:
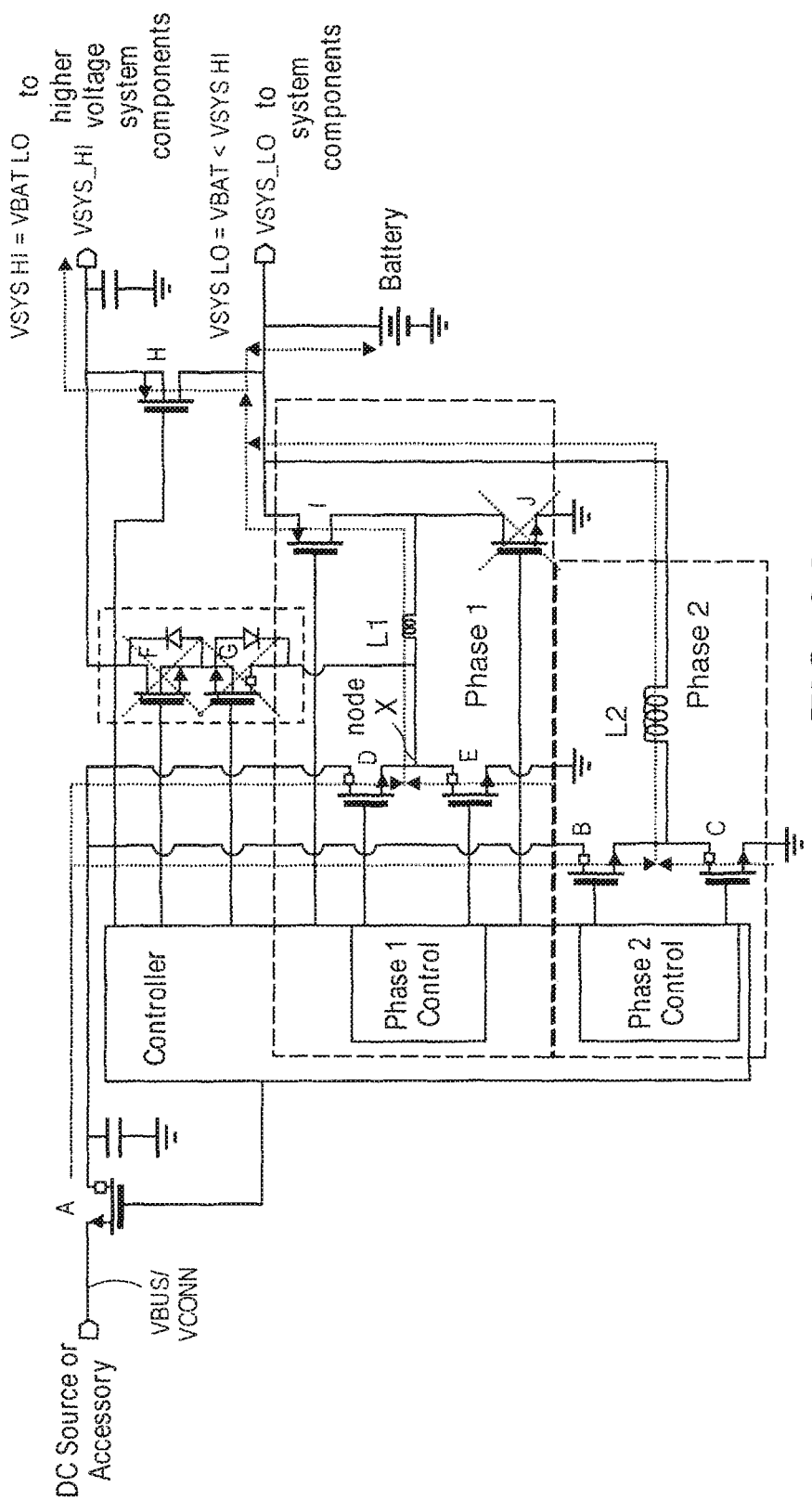
Figure 9B:
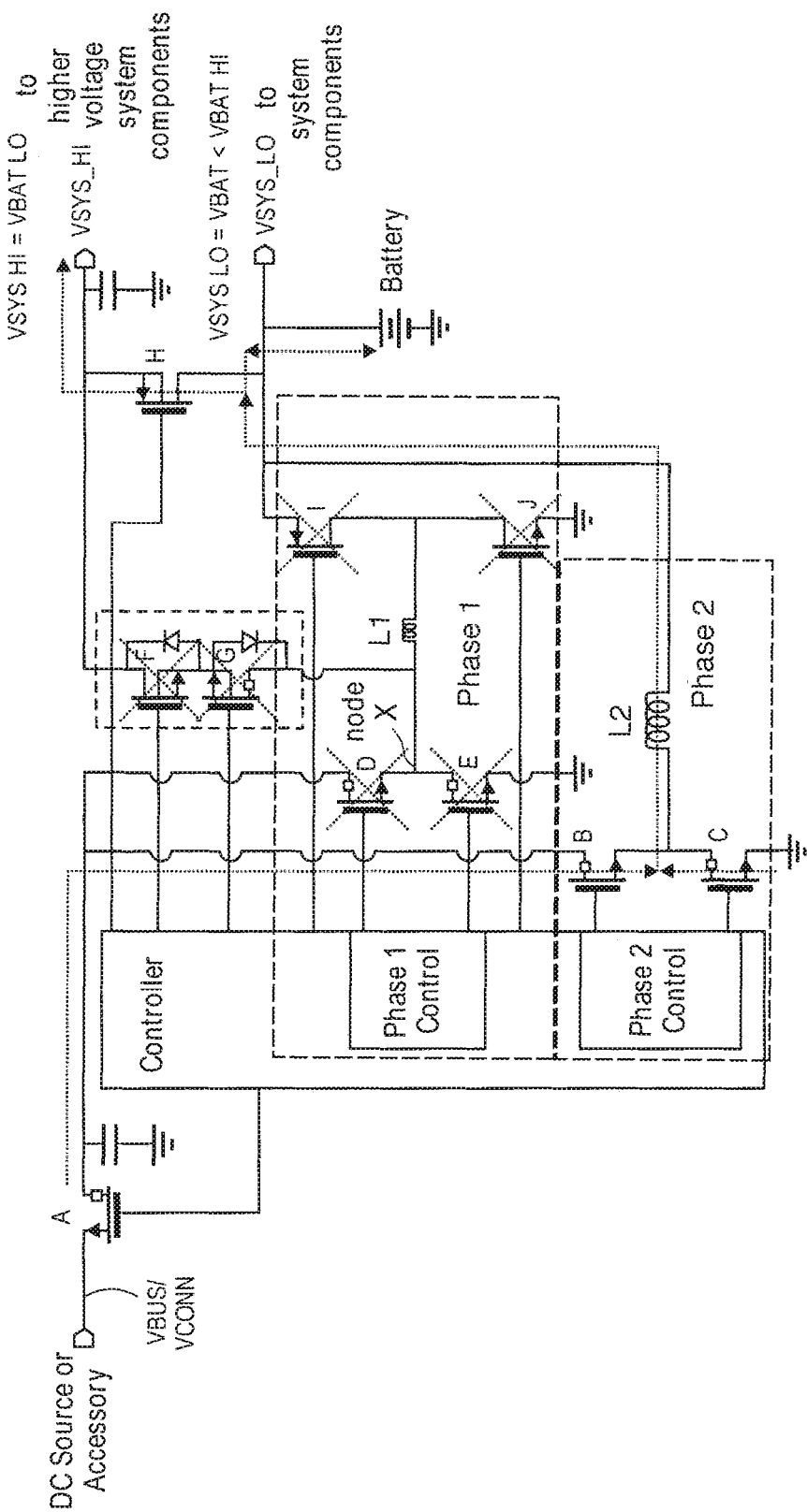

In this scenario, illustrated in FIGS. 9a-9b, an external DC power source may be attached to VBUS, while the battery 3 is in a mid voltage state. Here, switch A is closed and the VBUS voltage is sufficiently high so as to charge the battery without buck-boost charging needed, and also the system boost is not required (because the battery voltage is greater than its lower threshold, VBAT_LO, the VSYS_LO node can supply VSYS_HI directly). In this scenario both phases are free to be used to charge the battery 3, and so the charger 15 can either operate in single phase mode or multi-phase mode. Multi-phase mode is depicted in FIG. 9a, where there are paths drawn through both phases, while single phase mode (phase 2 active, phase 1 idle) is depicted in FIG. 9b. In both FIG. 9a and FIG. 9b, switch FG remains continuously open. In FIG. 9a, switch I is continuously closed and switch J is continuously open, while switches D, E and B, C are pulsed according to a multi-phase buck conversion algorithm. In FIG. 9b, switches D, E, I, J are kept continuously open, while switches B, C are pulsed according to a single phase, buck conversion algorithm. The operating mode can potentially be chosen to optimize the efficiency depending on the capabilities of the external DC power source. For example, if the external DC power source is a "smaller", 5 W power adapter then the controller 2 may decide to only use a single phase (FIG. 9b), in order to optimize efficiency and charge time. Adding the ability to sense the combined load current (battery charging current plus the current to the system components through the VSYS_HI node and the VSYS_LO node) could also allow the controller 2 to automatically switch between single phase (FIG. 9b) and two phase (FIG. 9a) operation, based on the combined load current, in order to further optimize efficiency.

Example 7—Low Voltage Charging in Battery Low

Figure 10:
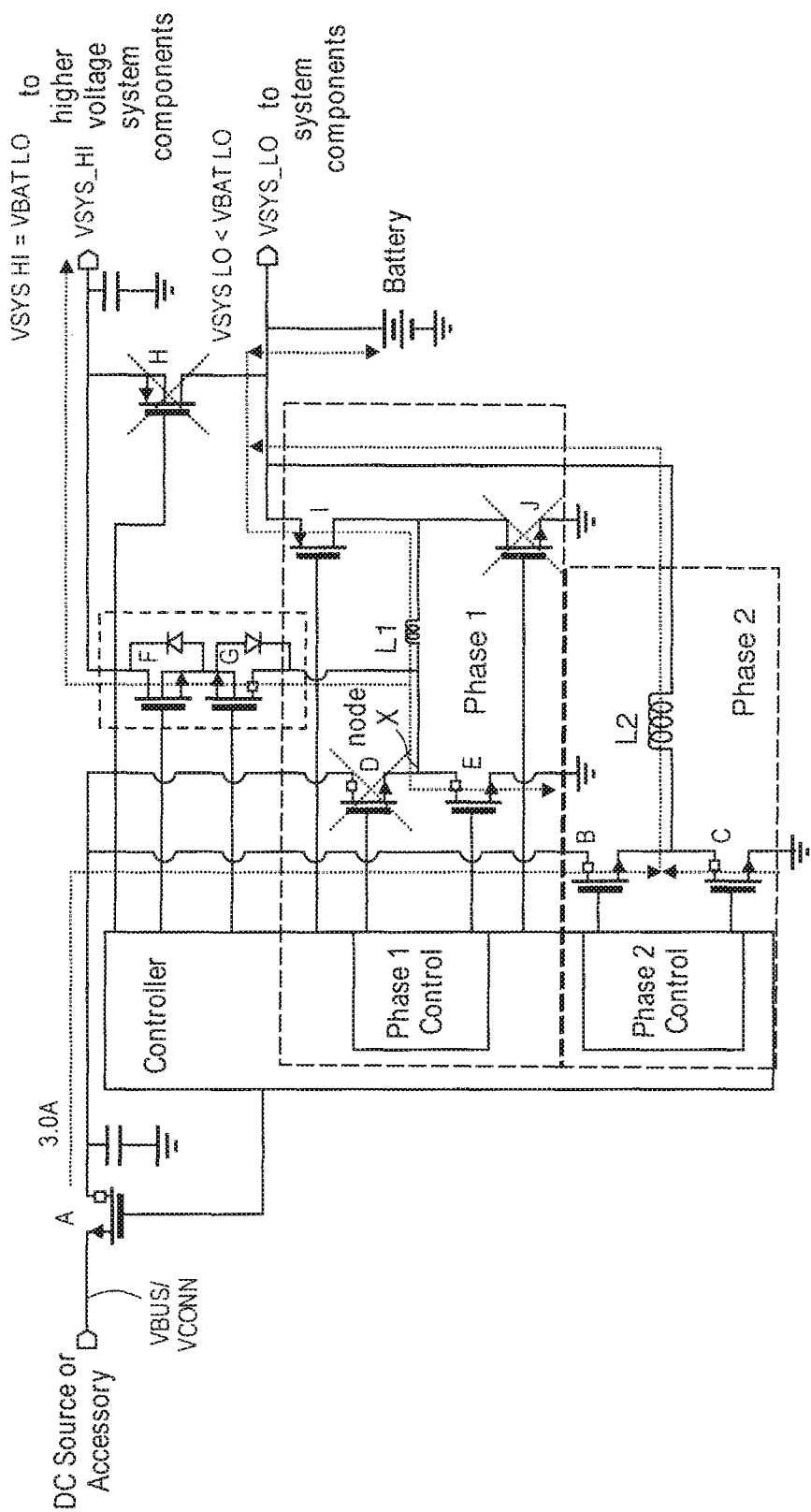

In this scenario, referring now to FIG. 10, an external DC power adapter may be attached to VBUS (so that switch A is maintained continuously closed), while the battery 3 is in a low voltage state. Here the VBUS voltage is sufficient to charge the battery (by pulsing switches B, C to control charge current through phase 2 according to any suitable buck conversion algorithm.) However, the system boost is required—switches H, J and D are kept open continuously, while switch I is kept closed continuously, and switches FG, E are pulsed according to any suitable boost type or step-up SMPS control algorithm, to supply VSYS_HI, from the VSYS_LO node through phase 1. Thus, phase 2 is being used for charging, simultaneously with phase 1 being used for system boost.

Example 8—High Voltage Charging in Battery High

Figure 11:
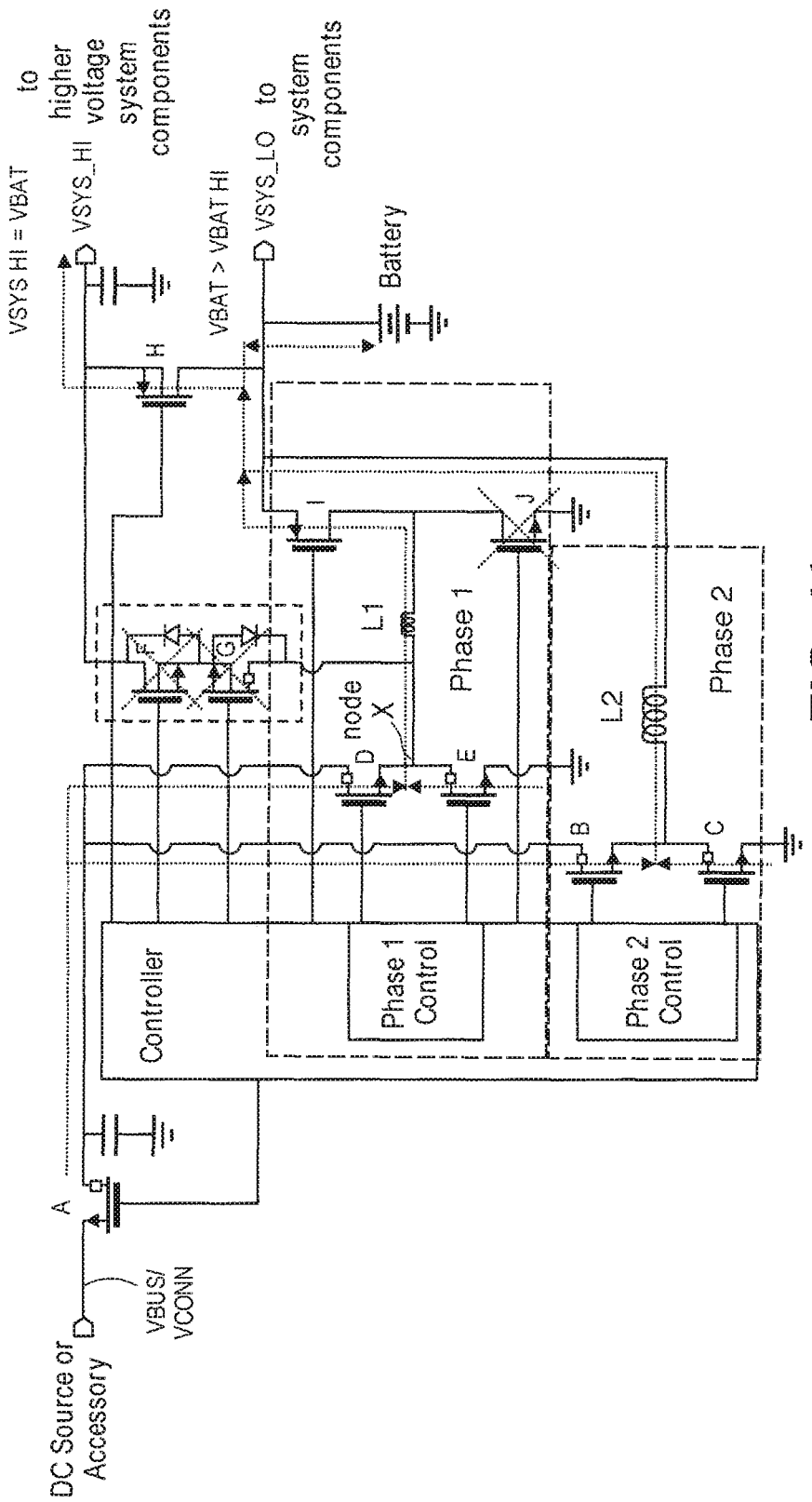

In this scenario, as seen in FIG. 11, a high voltage capable external DC power source may be attached (e.g. producing 14.5V), while the battery is in the high voltage state. Here the VBUS voltage is sufficiently high to charge the battery even though the battery is in its high voltage state (no boost needed). Furthermore, the system boost is also not required since the battery voltage is greater than its upper threshold (and hence switch H can be kept continuously closed.) In this scenario both phases are free to be used for charging, and so the charger 15 can either operate in single phase or two-phase mode. FIG. 11 shows the controller 2 controlling the charging using both phases 1, 2 (by pulsing switches D, E for phase 1 and pulsing switches B, C for phase 2 in accordance with any suitable buck or step down SMPS control scheme, while continuously keeping switches FG and J open and switch I closed.

Example 9—High Voltage Charging in Battery Mid

Figure 12:
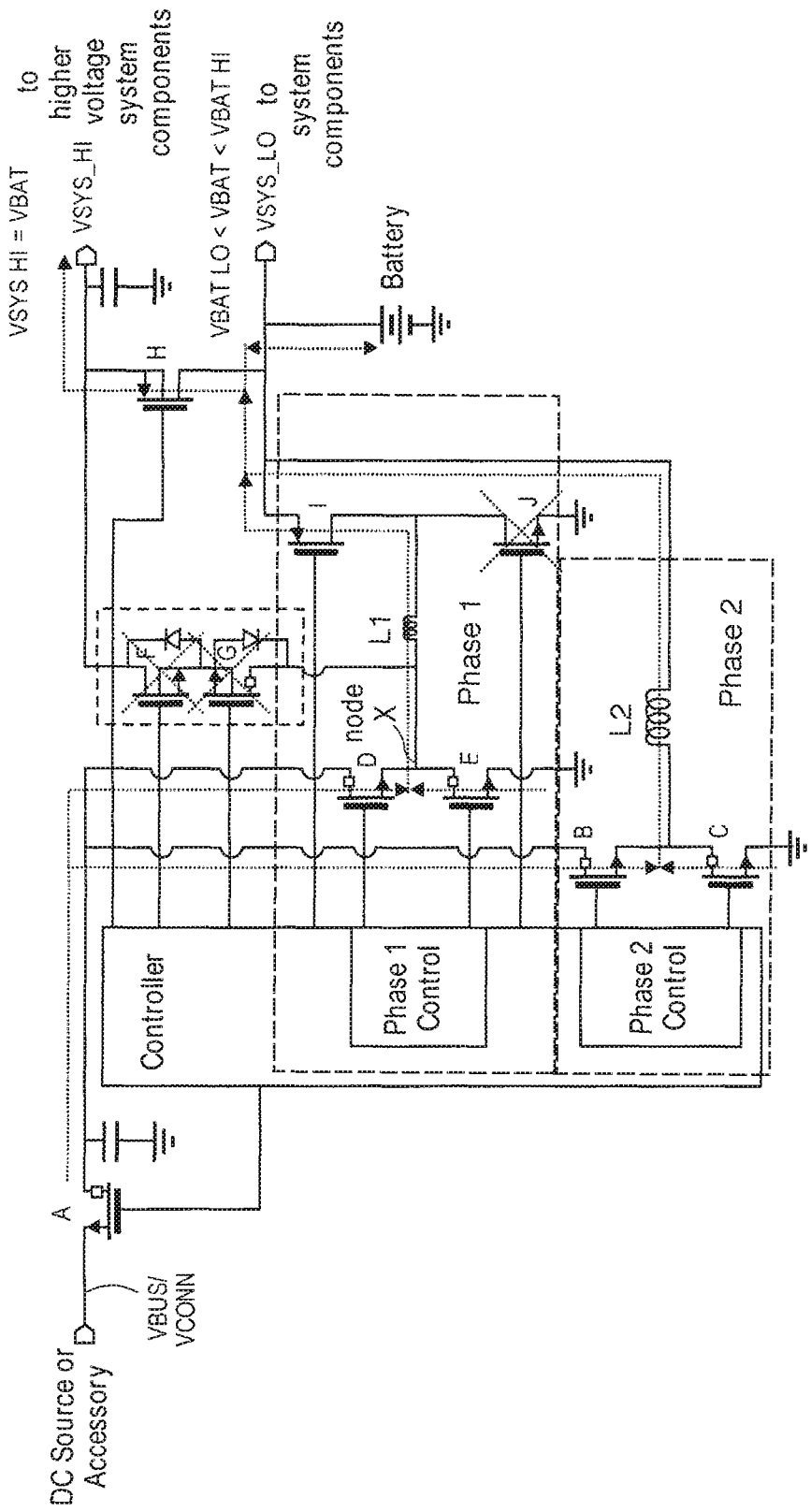

Turning now to FIG. 12, in this scenario a high voltage capable external DC source may be attached to VBUS (e.g., producing 14.5V), while the battery is in its mid voltage state. Here the VBUS voltage is sufficiently high so as to charge the battery 3 (without boost.) Furthermore, the system boost is not required since the battery voltage is high enough (VBAT>VBAT_LO.) In this scenario both phases are free to be used for charging, and so the charger 15 can either operate in single or multi-phase mode (when charging the battery 3 from VBUS). Since a high enough VBUS voltage is available, multi-phase operation is most likely, in order to deliver greater charging current to the battery 3. The controller 2 has thus configured the switches A-J the same as for Example 8 (FIG. 11.)

Example 10—High Voltage Charging in Battery Low

Figure 13:
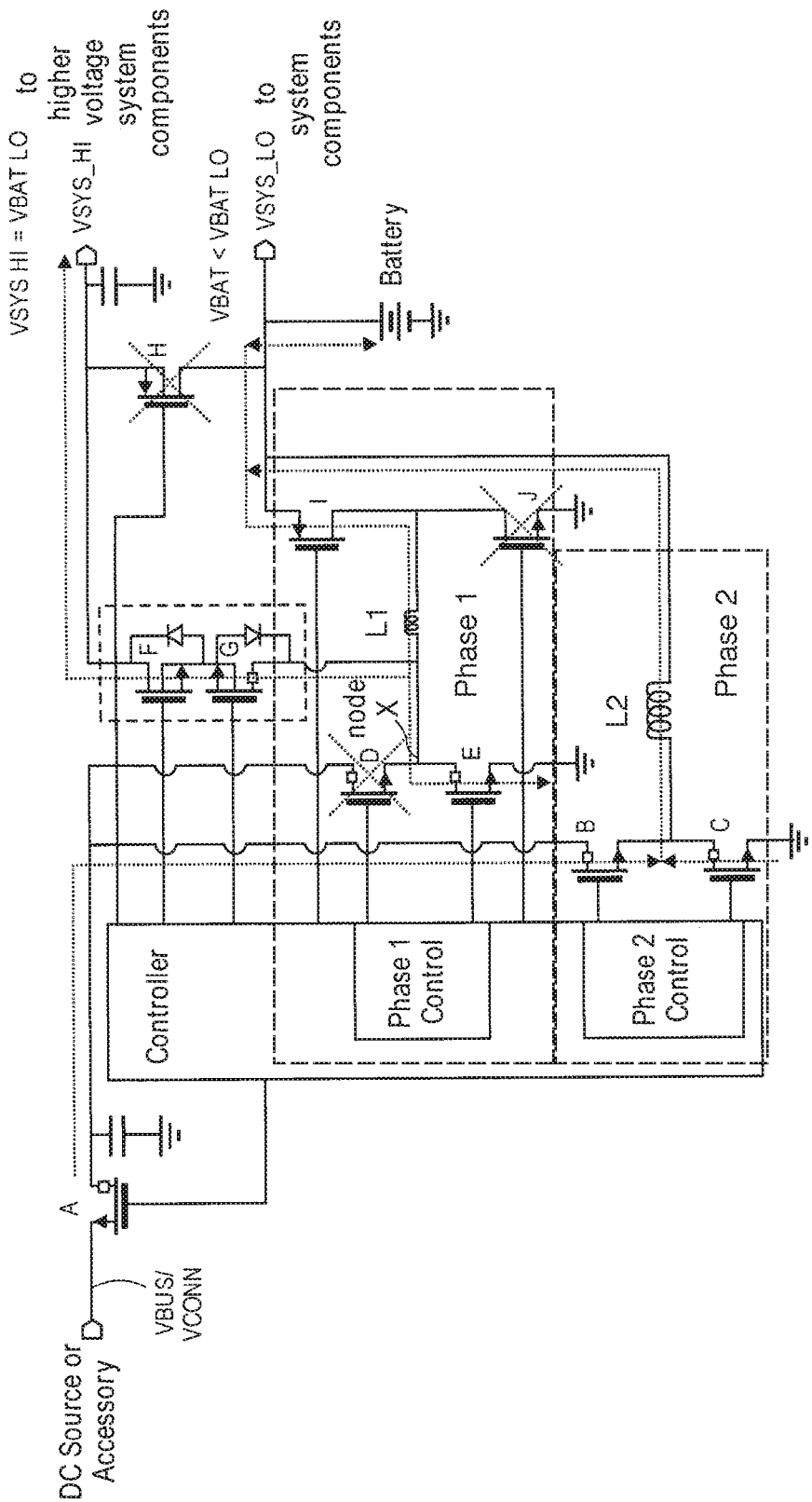

In this scenario, using FIG. 10 or FIG. 13 to illustrate, a high voltage capable external DC source (e.g., 14.5V) is attached at VBUS, while the battery 3 is in the low voltage state. Here the VBUS voltage is sufficient to charge the battery 3 without boost, but the system boost is required because the battery voltage is not sufficient to directly supply VSYS_HI. In this scenario only one phase is available to charge the battery 3, because the other phase is used by the system boost to supply VSYS_HI. To reduce charge time, the controller 2 may decide to select a larger phase, here phase 2, for charging the battery 3, while a smaller phase, here phase 1, is selected for system boost. In this scenario, similar to Example 7—Low Voltage Charging in Battery Low (FIG. 10), switches D, H and J are continuously kept open, and switch I is continuously kept closed, while switch pair B, C are pulsed for charging through phase 2 (e.g., in accordance with any suitable voltage or current based charging control algorithm) while switch pair FG, E are pulsed to provide power from the VSYS_LO node through phase 1, in accordance with a suitable boost or step up conversion algorithm, to maintain a desired voltage on VSYS_HI (e.g., regulate to a desired voltage.)

A method for charging a battery in the portable electronic device 10, may proceed as follows (noting however that some of the operations listed below may take place in a different order.) The controller 2 is sensing voltage of the battery 3, and is also determining whether or not an external power source that can provide DC power at the input of a charger 15, to charge the battery, is coupled to the portable electronic device 10. As seen for example, in FIG. 8, the charger 15 has the first output VSYS_LO that is coupled to charge the battery 3 and supply power to a first system component of the device 10. There is also a second output VSYS_HI that is coupled to supply power to a second system component of the device. There is also a first phase (phase 1), and a second phase (phase 2). When the external power source is coupled to the portable electronic device, and the sensed voltage of the battery is greater than a threshold, the controller 2 configures the switches in the charger 15 so that between the input and the first output, there is a buck-boost converter that uses the first phase of the charger 15 when the battery 3 is charging, while the second phase of the charger circuit is idle and the first output is supplying power to the second output. This is exemplified in FIG. 8. In addition, in the particular embodiment shown in FIG. 8, the first output VSYS_LO is supplying power directly to the second output VSYS_HI (through the continuously closed, switch H.) This configuration of the charger 15, as a buck-boost converter, may be in response to the controller 2 having determined that a) the sensed voltage of the battery 3 is higher than voltage at the input or b) the sensed voltage of the battery 3 is insufficiently lower than voltage at the input.

In another embodiment, a method for charging the battery 3 may proceed as follows. An external power source is coupled to the portable electronic device 10 and the sensed voltage of the battery 3 is less than a threshold, such that controller 2 configures the charger 15, between the input and the first output VSYS_LO, as a buck converter that is a single-phase converter which uses the first phase or the second phase, not both, to charge the battery 3. This situation is depicted in FIG. 9b. Alternatively, the controller 2 could configure the charger 15, between the input and the first output, to change as between a) a single-phase converter that uses the first phase or the second phase, not both simultaneously, and b) a multi-phase converter that uses the first phase and the second phase, to charge the battery. The latter, multi-phase case is exemplified in FIG. 9a.

In yet another embodiment of a method for charging the battery 3, when an external power source is coupled to the portable electronic device, and the sensed voltage of the battery is less than a threshold, the charger 15 is configured, as follows, namely as a buck converter that uses one of the first and second phases, not both, to charge the battery 3 from the input, and simultaneously as a boost converter that uses another one of the first and second phases to supply power from the first output to the second output (system boost.) This is exemplified in FIG. 10.

In yet another embodiment, a method for using the battery 3 to provide power to the second output of the charger 15 may proceed as follows. When an external power source that can charge the battery 3 is not coupled to the input (as detected by the controller 2, for example when an accessory is attached to the connector 17 of the portable device 10), the charger 15 is configured as a boost converter that uses phase 1, not phase 2, to supply power from the first output through the first phase to the second output (system boost). This is exemplified in FIG. 5.

In another embodiment, when a power source is not coupled to the input of the charger 15, the charger 15 may be configured as a first boost converter that uses the second phase to supply power from the first output to the input (reverse boost), and, simultaneously, a second boost converter that uses the first phase to supply power from the first output to the second output (system boost.) This is exemplified in FIG. 7.

In yet another embodiment, when an external power source is not coupled to the portable electronic device 10 (and in particular to the input of the charger 15), the charger 15 becomes configured as a boost converter that uses the second phase to supply power from the first output to the input (reverse boost), and, simultaneously, the first output is supplying power directly to the second output (because the battery voltage is sufficiently high.) This is exemplified in FIG. 6.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, while the figures depict each of the various solid state switches as one or more FETs, it should be understood that other types of solid state switches may instead be used including other types of transistors, and also more complex switch designs that have more than two constituent transistors. The description is thus to be regarded as illustrative instead of limiting.

What is claimed is:

1. A battery charger circuit comprising:
an input;
a first output to be coupled to a battery;
a second output;
a plurality of inductors including a first inductor and a second inductor;
a plurality of switches including
a first high side switch that couples a first terminal of the first inductor to the input, and a first low side switch that couples the first terminal of the first inductor to ground,
a second high side switch that couples a second terminal of the first inductor to the first output, and a second low side switch that couples the second terminal of the first inductor to ground,
a third high side switch that couples a first terminal of the second inductor to the input, and third low side switch that couples the first terminal of the second inductor to ground, wherein a second terminal of the second inductor is coupled to the first output,
a fourth switch that couples the first terminal of the first inductor to the second output; and
a controller configured to operate the plurality of switches and the plurality of inductors as a buck converter to charge the battery at a low battery voltage and as a boost converter to charge the battery at a high battery voltage, wherein the controller is configured to signal the first high side switch and the second low side switch to remain open continuously while a system boost is active, wherein the system boost is active when the controller signals the first low side switch and the fourth switch into open and closed states in a way that configures the battery charger circuit, from the first output through the first phase to the second output, as the boost converter.

2. The battery charger circuit of claim 1 wherein the controller is to configure the battery charger circuit as the boost converter, in response to determining that voltage of the battery is a) higher than voltage at the input or b) insufficiently lower than voltage at the input.

3. The battery charger circuit of claim 1 wherein the second terminal of the second inductor is directly coupled to the first output, and the first inductor has lower inductance than the second inductor by at least 25%.

4. The battery charger circuit of claim 1 wherein system boost is active when the battery charger circuit is supplying power to the second output from the battery.

5. The battery charger circuit of claim 1 wherein the controller is to signal the third high side switch and the third low side switch into open and closed states in a way that configures the battery charger circuit, from the first output through the second phase to the input, as the boost converter, simultaneously with the system boost being active through the first phase.

6. The battery charger circuit of claim 1 further comprising a fifth switch that couples the first output node to the second output node, wherein the controller is to signal the fifth switch to close when the voltage of the battery is above a threshold or when the controller responds to a transient condition that causes voltage of the first output node to exceed that of the second output node.

7. The battery charger circuit of claim 1 in combination with an externally exposed connector of a portable device, wherein the connector has a plurality of pins, and wherein the input is one of the plurality of pins of the connector.

8. The battery charger circuit of claim 1 wherein the controller is to signal the third high side switch and the third low side switch into open and closed states in a way that configures the battery charger circuit, from the input through the second phase to the first output, as the buck converter, simultaneously with the system boost being active through the first phase.

9. A battery charger circuit comprising:
an input;
a first output to be coupled to a battery;
a second output;
a plurality of inductors including a first inductor and a second inductor;
a plurality of switches including
a first high side switch that couples a first terminal of the first inductor to the input, and a first low side switch that couples the first terminal of the first inductor to ground,
a second high side switch that couples a second terminal of the first inductor to the first output, and a second low side switch that couples the second terminal of the first inductor to ground,
a third high side switch that couples a first terminal of the second inductor to the input, and third low side switch that couples the first terminal of the second inductor to ground, wherein a second terminal of the second inductor is coupled to the first output,
a fourth switch that that couples the first terminal of the first inductor to the second output; and
a controller configured to operate the plurality of switches and the plurality of inductors as a buck converter to charge the battery at a low battery voltage and as a boost converter to charge the battery at a high battery voltage, wherein the controller is configured to signal the first high side and low side switches and the third high side and low side switches to open and close in a way that configures the battery charger circuit as a multi-phase buck converter, while continuously keeping the fourth switch and the second low side switch open and the second high side switch closed.

10. The battery charger circuit of claim 9 wherein the second terminal of the second inductor is directly coupled to the first output, and the first inductor has lower inductance than the second inductor by at least 25%.

11. The battery charger circuit of claim 9 in combination with an externally exposed connector of a portable device, wherein the connector has a plurality of pins, and wherein the input is one of the plurality of pins of the connector.

* * * * *